Figure 1:
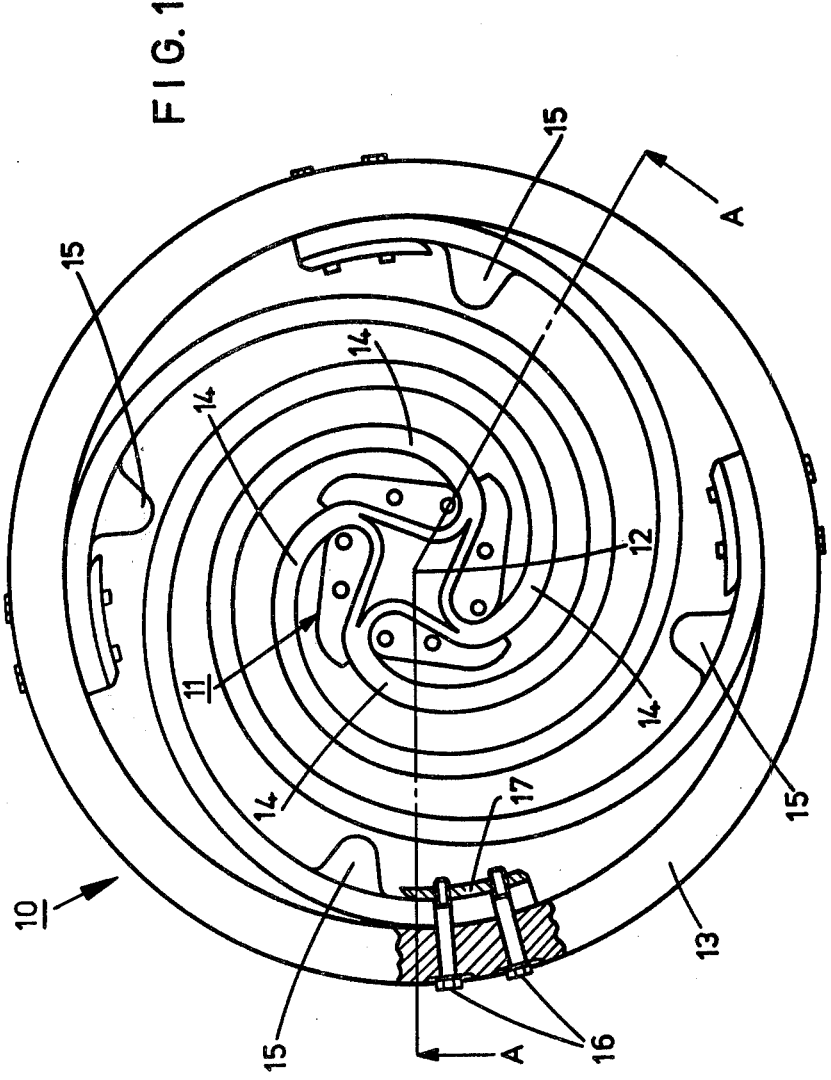

United States Patent [19]

Vincent et al.

[11] 4,145,936
[45] Mar. 27, 1979

[54] VIBRATION ABSORBERS

[75] Inventors: Alan H. Vincent, East Coker; Stephen P. King, Stoke-sub-Hamdon, both of England

[73] Assignee: Westland Aircraft Limited, Yeovil, England

[21] Appl. No.: 761,310

[22] Filed: Jan. 21, 1977

[30] Foreign Application Priority Data

Jan. 20, 1976 [GB] United Kingdom ............... 02234/76

[51] Int. Cl.² .............................................. F16C 15/00
[52] U.S. Cl. ........................................ 74/574; 416/500
[58] Field of Search .......................... 74/574, 572–573; 416/135, 145, 500

[56] References Cited

U.S. PATENT DOCUMENTS

| 1,357,366 | 11/1920 | White | 416/135 |
|---|---|---|---|
| 1,854,329 | 4/1932 | Carter | 416/135 X |
| 1,975,118 | 10/1934 | Moodie | 416/135 |
| 3,208,303 | 9/1965 | Durouchoux | 74/572 |
| 3,298,443 | 1/1967 | Burkam et al. | 416/31 |
| 3,312,125 | 4/1967 | Durouchoux | 74/572 |
| 3,387,505 | 6/1968 | Rumsey | 74/574 |
| 3,910,720 | 10/1975 | Vincent et al. | 416/145 |
| 3,964,341 | 6/1976 | Rabenhorst | 74/572 |
| 3,982,447 | 9/1976 | Rabenhorst | 74/572 |
| 3,990,324 | 11/1976 | Fishbaugh et al. | 74/574 |
| 4,044,628 | 8/1977 | Jacks | 74/574 |

FOREIGN PATENT DOCUMENTS

| 262685 | 7/1913 | Fed. Rep. of Germany | 416/133 |
|---|---|---|---|
| 365936 | 10/1920 | Fed. Rep. of Germany | 74/572 |
| 1001361 | 8/1965 | United Kingdom | 74/572 |

Primary Examiner—Everette A. Powell, Jr.
Attorney, Agent, or Firm—Larson, Taylor and Hinds

[57] ABSTRACT

A vibration absorber includes a hub arranged for rotation during operation about an aixs, a mass encircling the hub and a plurality of resilient arms extending in a spaced-apart spiral pattern between the hub and the mass so that the mass rotates with the hub in a plane of rotation perpendicular to the axis and is capable of equal resilient deflection in any direction within its plane of rotation. In operation the absorber operates as a spring mass device and finds particular application in damping vibrations in a helicopter rotor due to the facility to simultaneously cancel vibration forces of different frequencies.

4 Claims, 4 Drawing Figures

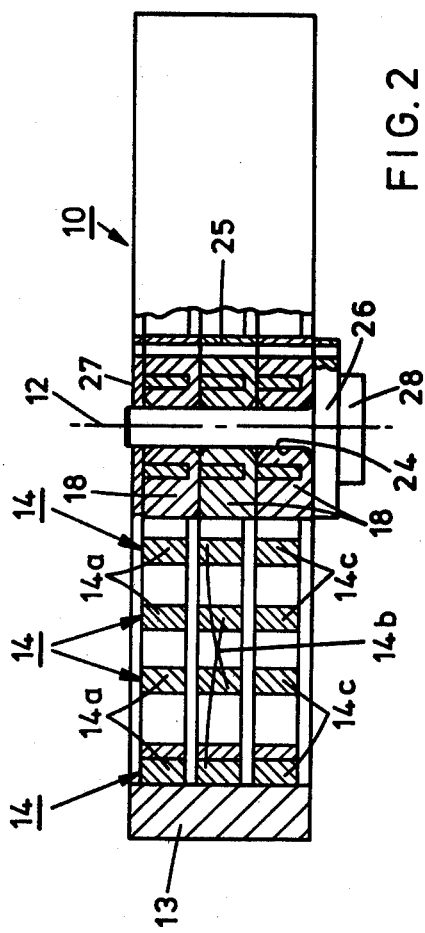

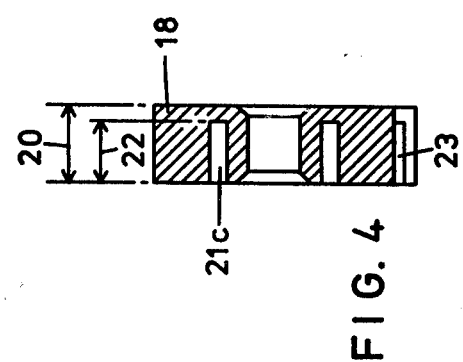
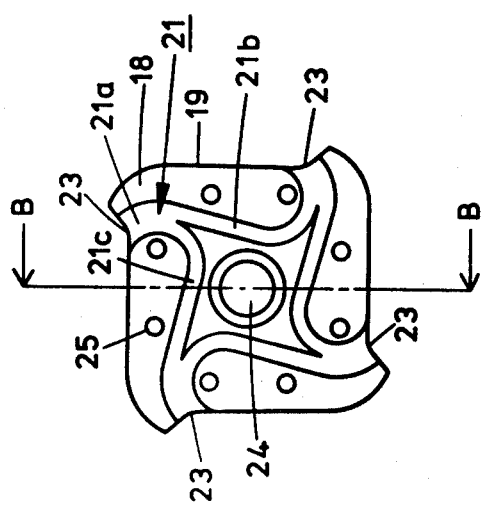

VIBRATION ABSORBERS

This invention relates to vibration absorbers, and particularly to vibration absorbers for cancelling or substantially reducing vibration forces active on a helicopter rotor.

Accordingly, in one aspect, the invention provides a vibration absorber including a hub arranged during operation for rotation about an axis, a mass encircling the hub, and a plurality of resilient arms extending in a spaced-apart spiral pattern between the hub and the mass so that during operation the mass is rotated with the hub in a plane of rotation substantially perpendicular to said axis, and is capable of substantially equal resilient deflection in any direction within its plane of rotation.

Means may be provided for limiting deflections of the mass to a predetermined amount during operation and, conveniently, said means may comprise a plurality of symmetrically located snubbers arranged so as to contact a surface of an adjacent arm when said mass is deflected by the predetermined amount during operation.

Preferably, said arms are constructed of fibre-reinforced plastics material so as to simplify manufacture and reduce weight. In one form of the invention the material comprises unidirectional glass fibre-reinforced plastics material and, conveniently, at least the fibres of such material are extended through the hub so that neighbouring arms are interconnected to provide good strength characteristics.

In such an arrangement the hub may comprise a hub centre having a periphery and a thickness, and slots being formed part way through its thickness and in which the inner ends of the arms are housed, said slots being arranged with openings in the periphery of the hub centre corresponding in number to the number of arms, and in width to the thickness of the arms. Each said slot may, conveniently, be sub-divided within the hub centre into two slotted portions having a width approximately equal to one half the thickness dimension of each arm, the subdivided portions of a particular opening interconnecting with the other opening or, in the case of an arrangement having three or more arms, interconnecting with the two adjacent openings.

In one particular form of the invention, each resilient arm comprises at least two superimposed layers arranged in a stacked assembly and connected to a common mass. Conveniently, each superimposed layer may extend from an individual hub centre, each said hub centre being provided with means to fixedly attach the stacked hub centres to each other.

In another aspect, the invention provides in or for a helicopter rotor arranged for rotation during operation about an axis, a vibration absorber including a hub arranged for rotation with the rotor about said axis, a ring positioned around the hub and spaced therefrom, a plurality of resilient arms interconnecting the hub and the ring and arranged so that during operation the ring is rotated in a plane substantially parallel to a plane of rotation of the rotor, the resilient arms extending in a spaced-apart spiral pattern between the hub and the ring and being arranged so that the ring is capable of substantially equal resilient deflection in any direction within its plane of rotation.

The invention will now be described by way of example only and with reference to the accompanying drawings in which:

FIG. 1 is a part sectioned plan view of a vibration absorber according to an embodiment of the invention, FIG. 2 is a part sectioned side elevation of the absorber of FIG. 1 and taken along lines A—A of FIG. 1, FIG. 3 is a plan view of a detail part of the absorber of FIGS. 1 and 2, and FIG. 4 is a sectioned view taken along lines B—B of FIG. 3.

A vibration absorber, generally indicated at 10, includes a hub 11 arranged during operation for rotation about an axis 12. A mass in the form of a steel ring 13 encircles the hub 11, and four resilient arms 14 equi-spaced around the hub 11 extend in a spaced-apart spiral pattern from the hub 11 to interconnect the hub 11 and the ring 13.

The arms 14 support and locate the ring 13 so that, when at rest, the ring 13 is located symmetrically of the axis 12 and, during operation, is rotated with the hub 11 in a plane of rotation perpendicular to the axis 12. The resilience and arrangement of the arms 14 ensure that the ring 13 is capable of equal resilient deflection in any direction within its plane of rotation.

In the illustrated embodiment the arms 14 are constructed of unidirectional glass fibre-reinforced plastics material, and an outer end of each arm 14 is secured to the ring 13 by two bolts 16, located through holes in the ring 13 and the end of the arm 14, and screwed into a clamping plate 17.

The inner end of each of the arms 14 is bifurcated and extended through the hub portion 11 to join with the inner ends of the neighbouring arms in a manner such that the glass fibres of the neighbouring arms are continuous, thereby providing a strong assembly. This is admitted by the provision of a light alloy hub centre 18 (FIGS. 3 and 4) having a generally square peripheral shape 19 and a thickness dimension indicated at 20.

Four slots generally indicated at 21 are machined in one surface of the hub centre 18, and extend through a depth indicated at 22 that is less than the thickness dimension 20. Each slot 21 has an opening 23 in the periphery 19 of the hub centre 18, the openings 23 being arranged symmetrically and being of a width substantially equal to the width of each arm 14. The slot 21 extends into the hub centre 18 from each opening 23 through a full width portion 21a and is then sub-divided into two slotted portions 21b and 21c each having a width dimension equal to one half of the thickness dimension of each portion 21a. The slotted portions 21b and 21c extend within the hub centre 18 to join with the full width portions 21a at adjacent openings 23. In this manner it will be appreciated that the unidirectional fibres of each arm 14 are joined with the fibres of its two neighbouring arms 14 to facilitate manufacture and provide a strong assembly.

The hub centre 18 has a central axial hole 24 and a ring of eight symmetrical axially arranged equi-spaced holes 25 for a purpose to be hereinafter fully explained.

Referring again to FIG. 1, the vibration absorber 10 includes amplitude limiting means in the form of four snubbers 15. The snubbers 15 are equi-spaced and located symmetrically of the axis 12 and arranged one on each arm 14 and slightly inboard of its attachment to the ring 13. Each snubber 15 comprises a rubber block fixedly attached to its associated arm 14 and extending inwardly to terminate at an inner edge that, in the position of rest, is spaced-apart from an outer surface of the adjacent arm 14.

In FIG. 2 it will be seen that, in the embodiment being described, each arm 14 comprises a superimposed stack of three layers 14a, 14b and 14c, extending from individual hub centres 18 and connected to a common ring 13 in the manner previously described.

A flanged location spigot 26 is fitted through the central apertures of the three hub centres 18, the flange being provided with a ring of holes corresponding to the holes 25 through the hub centres 18. An upper clamping plate 27 (omitted from FIG. 1 for clarity) is located over a protruding end of the spigot 26 and is also provided with corresponding holes, thereby facilitating clamping of the assembly by a ring of eight bolts (not shown).

A boss 28 is provided at the lower end of the spigot 26 concentric of the axis 12 and provides a location for the absorber 10 by mating with a complementary recess in a helicopter rotor (not shown), and the ring of eight bolts is utilised also to attach the absorber to the rotor.

In the design of a vibration absorber according to the invention it is necessary firstly to estimate the forces that it is required to generate, and the vibration frequencies to be encountered, so that an appropriate mass for the absorber ring 13 can be estimated. The number and stiffness of the springs supporting the ring and constituted by the arms 14 to provide the correct frequency and amplitude of ring motion to provide the required forces can then be calculated.

The variables to be considered in the construction of the arms 14 are:
1. the number of arms,
2. the material used,
3. the length of each arm,
4. the overall radius of the absorber 10 and consequently, in view of 3 above, the rate at which each arm wraps around the centre,
5. the thickness of the arms, and
6. the depth of the arms.

Based upon material properties (Youngs Modulus, allowable stress limits and density) and manufacturing considerations, a suitable material and the number of arms is selected; in the embodiment shown, there are four arms constructed of unidirectional glass fibre-reinforced plastics material.

Knowing the clearance required between the arms 14 to permit ring movements of a required amplitude and the number of arms, and making an estimate of the required thickness of each arm 14, a maximum rate of wrap about the axis 12 can be determined. It has been found that increasing the rate of wrap of the arms tends to decrease the parasitic weight and overall radius of the device for a given performance.

Having determined a suitable rate of wrap and length for each arm 14, the exact thickness and depth of the arms 14 can be calculated to provide the required stiffness and satisfactory stress limits.

The solution with the most desirable properties, i.e. minimum parasitic weight, minimum overall radius and an acceptable depth is chosen from the family of possible solutions resulting from the above calculations.

The in-plane stiffness, and the stress distribution due to in-plane motion, depends only upon the total depth of the arms and not the number of superimposed layers. Thus, one layer of depth "d" has the same in-plane properties as two layers of depth "d/2." It should be noted that this is not, however, true for out-of-plane motion of the ring, i.e. translation and rotation of the ring with respect to the hub (e.g. vertical vertical translation and pitch and roll motions), for which the stiffness decreases as the number of layers is increased, for a constant total arm depth.

Both axial and in-plane translational frequencies are independent of the distribution of mass in the ring 13, but the torsion and out-of-plane rotation — e.g. pitch and roll — frequencies will depend on this distribution. This is true whether the mass is in the form of a simple ring 13 or comprises, for example, a dome or dish consisting of a ring with a plate across the top. However, in all cases it is important that the ring 13 is effectively rigid.

By utilising the information outlined above, it is possible to construct the absorber so that it has required responses to various in-plane and out-of-plane vibration frequencies.

For instance, the absorber 10 shown in the drawings includes, for a particular application, a steel ring 13 having an outside diameter of 18 inches, an internal diameter of 15.540 inches and a depth of 4 inches. Glass fibre-reinforced fabric material was chosen for the arms 14, mainly for its light weight and ease of manufacture, and it was decided that four arms would be required each having an effective length of 25 inches, a thickness of 0.536 inches and a total depth of 3 inches. The vertical stacked arrangement of three layers shown in FIG. 2 was chosen to facilitate ease of manufacture of the arms 14 which, consequently, each have a depth of 1 inch to provide the overall depth of 3 inches. In this respect it is worth noting, however, that this type of stacked construction has other advantages in that it provides an opportunity to adjust the relative stiffnesses in adjacent layers by rotating one relative to another in order to average out errors in the overall assembly.

In extending between the hub 11 and ring 13, each arm is spirally wrapped around the axis 12 through an operational angle of approximately 300°.

The particular material chosen for the arms was pre-impregnated unidirectional sheets of 0.010 inches thick glass fibre material having a flexural strength of 170,000 pounds per square inch and a Modulus of $5.9 \times 10^6$ pounds per square inch.

Other materials having suitable properties, such as a steel or titanium, could be used for the arms 14. However, it would be more difficult to manufacture arms in such materials, owing to machining problems, than in the composite, glass fibre-reinforced plastics, material discussed. A further advantage of using such a composite material is that it tends to delaminate slowly before a final failure, thereby providing an opportunity to detect a trend to failure before it occurs. In this respect it should also be noted that, whatever material is used for the arms, a failure of one arm will result only in a detuning of the absorber, and not in its immediate destruction, because the remaining arms will accept the resulting increased loads, assuming appropriate choice of stress levels by the original design. The absorber of the present invention can, therefore, exhibit a desirable "fail-safe" characteristic.

In construction of the composite arms 14, the unidirectional glass fibres are first laid up in a female mould so as to have the same cross-sectional area as the desired finished shape, but being of reduced thickness dimension, and partly cured. This is to facilitate insertion of the arms 14 into the slot 21 in the hub centre 18 in the next phase of the operation in which the arms 14 are consolidated axially so as to be bonded to the hub centre and of the required thickness and depth.

In operation, the spiral arrangement and resilience of the arms 14 ensures that the absorber 10 operates as a sprung mass device which is capable of substantially equal resilient deflection in any direction within its plane of rotation to simultaneously cancel vibration forces of different frequencies within its plane of rotation. Appropriate tuning of the absorber 10 is accomplished at the design stage as hereinbefore described by appropriate choice of the mass of the ring 13 and of the dimensions and other properties of the flexible arms 14; fine tuning is accomplished by the provision of additional weights (not shown) located symmetrically of the axis 12.

The facility to simultaneously cancel vibration forces of different frequencies is of particular advantage to the elimination of in-plane (or horizontal) vibration forces active on a helicopter rotor. The troublesome in-plane vibration forces comprise $(n-1)$ frequency vibrations and $(n+1)$ frequency vibrations. By $(n-1)$ vibrations we mean the vibrations which oscillate at a frequency equal to the number of blades (n) minus one times rotor r.p.m., i.e. $(n-1) \times$ rotor r.p.m., and by $(n+1)$ vibrations we mean the vibrations which oscillate at a frequency equal to the number of blades (n) plus one times rotor r.p.m., i.e. $(n+1) \times$ rotor r.p.m. Taking a four-bladed rotor as an example, these vibrations are also sometimes referred to as 3R and 5R vibrations.

In such an installation the hub 11 of the absorber 10 is attached to a helicopter rotor so that the axis 12 is co-incident with the axis of rotation of the rotor, and so that the absorber 10 is rotated in a plane of rotation parallel to the plane of rotation of the rotor. The absorber 10 is tuned in the non-rotating condition to a frequency equal to N $\times$ rotor r.p.m. (4R for a four-bladed rotor) at normal operating speed, so that in the rotating condition at normal operating speed it will respond at both $(n-1)$ and $(n+1)$ frequency vibrations (3R and 5R for a four-bladed rotor), thus producing the required longitudinal and lateral fixed direction components of the correct relative magnitude and phase in a single installation. Furthermore, unequal force vectors can be effectively cancelled with no possibility of inducing an out-of-balance force at the helicopter rotor head.

The provision of the snubbers 15 in the illustrated embodiment provides an amplitude limiting device to protect the absorber from damage that may be caused by excessive deflections at rotor speeds other than the design rotor speed at which frequency the absorber is tuned. Such excessive deflections may, for example, be encountered during rotor start-up before design rotor speed is achieved.

It will be understood that the vibration absorber according to the present invention is not limited to use with a four-bladed rotor, and can be used effectively to simultaneously cancel in-plane vibration forces of both $(n-1)$ and $(n+1)$ frequencies in helicopter rotors having any number of blades.

A further advantage of the present absorber is the elimination of mechanical components such as springs and sliding and rolling surfaces usual in a sprung mass absorber. Such mechanical components are subject to wear, which may result in a de-tuning and an increase in maintenance requirements and costs.

If desired, two or more vibration absorbers 10 can be arranged in a stacked assembly on a helicopter rotor and can be tuned to cancel either vibrations of different frequencies or $(n-1)$ and $(n+1)$ frequency vibrations at different operating speeds, thereby extending the operational bandwidth of an overall vibration absorbing system. Furthermore, in a non-illustrated embodiment, the resilient arms may also be arranged to be resiliently flexible in a direction parallel to the axis of rotation 12, so that simultaneous cancellation or reduction of both in-plane and out-of-plane (or vertical) forces active on a helicopter rotor can be achieved.

Whilst an embodiment of the invention has been particularly described and illustrated, it will be understood that various modifications can be made without departing from the scope of the appended claims. For example, the absorber is not limited to having any particular number of arms 14; however, it is considered that a minimum of three arms is desirable for symmetry reasons. Clearly, the operational angle of the wrap of each arm about the axis can be varied to suit particular installations, although in any particular installation the angle of each arm will be constant. Other suitable fabrication techniques may be utilized in the construction of the absorber: for example, the hub 11, arms 14 and ring 13 may be formed as an integral assembly. Similarly, any suitable means may be employed to locate and attach the absorber to a rotating machine, such as a helicopter rotor, with which it is to operate. The arms 14 may be constructed of other composite material such as carbon or boron fibre-reinforced material, and the fibre-reinforcement material may be of a woven type as opposed to the unidirectional type hereinbefore described. The arms 14 are not limited to being of uniform thickness throughout their lengths, but may, for instance, be thickened locally at high stress areas.

We claim as our invention:

1. A vibration absorber comprising, in combination, a hub for rotation about an axis, a mass encircling said hub, a plurality or resilient arms extending in a spaced apart spiral pattern between the hub and the mass, said hub having slots therein and openings disposed in the periphery of the hub corresponding to the number of arms, the arm material extending through the slots in the hub and interconnecting with adjacent arms whereby all of the resilient arms are interconnected and during operation the mass being rotated with the hub in a plane of rotation substantially perpendicular to the axis of rotation and the mass being capable of equal resilient deflection in any direction within the plane of rotation thereof.

2. A vibration absorber according to claim 1 wherein said arms are constructed of fibre reinforced plastics material.

3. A vibration absorber comprising, in combination, a hub for rotation about an axis, a mass encircling the hub, a plurality of resilient arms extending in a spaced apart spiral pattern between the hub and the mass, each resilient arm comprising at least two superimposed layers arranged in a stacked assembly, each superimposed layer extending from an individual hub center, each hub center having a ring of symmetrical bolt holes for attachment of the stacked hub centers to each other, and a locating spigot extending through a central aperture in each of the stacked hub centers, said locating spigot having a flange portion with a ring of bolt holes corresponding to the holes in said hub centers for securement of said spigot to the stacked hub centers.

4. A vibration absorber as claimed in claim 3, including a location boss on the spigot, and arranged concentrically of the axis of rotation so as to provide a location for the absorber on an apparatus with which it is to be operated.

* * * * *